United States Patent
Kim

(10) Patent No.: US 8,817,582 B2
(45) Date of Patent: Aug. 26, 2014

(54) METHOD OF CONTROLLING AN OPTICAL DISC DRIVE, AND OPTICAL DISC DRIVE AND OPTICAL INFORMATION WRITING AND/OR READING SYSTEM USING THE METHOD

(71) Applicant: Toshiba Samsung Storage Technology Korea Corporation, Suwon-si (KR)

(72) Inventor: Hyun-jung Kim, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/674,857

(22) Filed: Nov. 12, 2012

(65) Prior Publication Data

US 2013/0142027 A1 Jun. 6, 2013

(30) Foreign Application Priority Data

Dec. 6, 2011 (KR) .......................... 10-2011-0129908

(51) Int. Cl.
*G11B 11/00* (2006.01)

(52) U.S. Cl.
USPC ..................................... 369/53.21

(58) Field of Classification Search
USPC ........ 369/47.12, 47.13, 53.21, 83, 84, 124.06
See application file for complete search history.

(56) References Cited

U.S. PATENT DOCUMENTS

| 6,882,608 B2* | 4/2005 | Watanabe et al. ........... 369/47.32 |
| 7,328,352 B2* | 2/2008 | Fontijn et al. .................. 713/193 |
| 7,974,166 B2* | 7/2011 | Hasebe et al. ............. 369/53.21 |
| 2002/0181356 A1* | 12/2002 | Watanabe et al. .......... 369/47.16 |
| 2006/0077825 A1* | 4/2006 | Nonaka et al. ............. 369/47.12 |
| 2009/0060191 A1* | 3/2009 | Yabuno ......................... 380/268 |
| 2009/0185467 A1* | 7/2009 | Brondijk .................... 369/53.21 |
| 2009/0208018 A1* | 8/2009 | Buckingham et al. ........ 380/277 |
| 2010/0220565 A1* | 9/2010 | Hasebe ....................... 369/47.14 |

FOREIGN PATENT DOCUMENTS

| JP | 2004-302870 | 10/2004 |
| KR | 10-2007-0013154 | 1/2007 |
| KR | 10-2010-0039504 | 4/2010 |

* cited by examiner

*Primary Examiner* — Brenda Bernardi
(74) *Attorney, Agent, or Firm* — NSIP Law

(57) ABSTRACT

Provided is a method of controlling an optical disc drive, and an optical disc drive using the method. Data that is to be transmitted from a host to the optical disc drive may be encoded. The encoded data may be transmitted to the optical disc drive, and the optical disc drive may decode the encoded data.

14 Claims, 6 Drawing Sheets

FIG. 3A
ATAPI COMMAND TABLE (in OPCode Order)

| ATAPI Command | Instruction | | OP |
|---|---|---|---|
| USER DEFINED PACKET COMMAND | Packet | PAKT | |
| READ CD AND SAVE TO FILE | Rd10File | | |
| WRITE (10) FROM FILE | Wr10File | | |
| WRITE AND VERIFY (10) FROM FILE | WrVfy10File | | |
| TEST UNIT READY | TstUnitRdy | TUR | 00h |
| REQUEST SENSE | ReqSense | | 03h |
| FORMAT UNIT | FmtUnit | | 04h |
| ATAPI RESET | ARST | | 08h |
| INQUIRY | Inquiry | INQR | 12h |
| RELEASE (6) | Release6 | | 17h |
| START STOP UNIT | StartUnit/StopUnit | | 18h |
| RECEIVE DIAGNOSTIC RESULTS | RcvDiag | | 1Ch |
| SEND DIAGNOSTICS | SendDiag | | 1Dh |
| PREVENT ALLOW MEDIUM REMOVAL | PrevMed/AllowMed | | 1Eh |
| READ FORMAT CAPACITIES | RdFmtCap | | 23h |
| READ CAPACITY | RdCap | | 25h |
| READ (10) | Rd10 | PKRD | 28h |
| WIRTE (10) | Wr10 | PKWR | 2Ah |
| WRITE (10) FROM FILE | Wr10File | | 2Ah |
| SEEK | PkSeek | | 2Bh |
| ERASE (10) | Erase | | 2Ch |
| WRITE AND VERIFY (10) | WrVfy | | 2Eh |
| WRITE AND VERIFY (10) FROM FILE | WrVfy10File | | 2Eh |
| VERIFY (10) | Verify | | 2Fh |
| SYNCHRONIZE CACHE (10) | SyncCache | | 35h |
| WRITE BUFFER | PkWrBuf | | 3Bh |
| READ BUFFER | PkRdBuf | | 3Ch |
| READ SUBCHANNEL | RdSubChv | | 42h |
| READ TOC/PMA/ATIP | RdToc | | 43h |
| READ HEADER | RdHeader | | 44h |
| PLAY AUDIO (10) | PlayAudio | | 45h |
| GET CONFIGURATION | GetCfg | | 46h |
| PLAY AUDIO MSF | PlayMSF | | 47h |
| GET EVENT/STATUS NOTIFICATION | GetEvent | | 4Ah |
| PAUSE/RESUME | Pause/Resume | | 4Bh |
| LOG SELECT | LogSelect | LSEL | 4Ch |
| LOG SENSE | LogSense | LSEN | 4Dh |
| STOP PLAY/SCAN | StopPlay | | 4Eh |
| READ DISC INFORMATION | RdDiscInf | | 51h |
| READ TRACK INFORMATION | RdTrkInf | | 52h |
| RESERVE TRACK | ResTrk | | 53h |
| SEND OPC INFORMATION | SendOPC | | 54h |
| MODE SELECT (10) | ModeSelect | MSEL | 55h |
| RELEASE (10) | Release10 | | 57h |
| REPAIR RZONE | RepairRzone | | 58h |

FIG. 3B

| ATAPI Command | Instruction | | OP |
|---|---|---|---|
| MODE SENSE (10) | ModeSense | MSEN | 5Ah |
| CLOSE TRACK/SESSION | CloseTrk | | 5Bh |
| READ BUFFER CAPACITY | RdBufCap | | 5Ch |
| SEND CUE SHEET | SendCue | | 5Dh |
| BLANK | Blank | | A1h |
| SEND EVENT | SendEvent | | A2h |
| SEND KEY | SendKey | | A3h |
| REPORT KEY | RptKey | | A4h |
| PLAY AUDIO (12) | PlayAudio12 | | A5h |
| LOAD/UNLOAD MEDIUM | LOAD | | A6h |
| SET READ AHEAD | SetRdAhead | | A7h |
| READ (12) | Rd12 | | A8h |
| WRITE (12) | Write12 | WR12 | AAh |
| GET PERFORMANCE | GetPerf | | ACh |
| READ DISK STRUCTURE | RdStruct | | ADh |
| SET STREAMING | SetStream | | B6h |
| READ CD MSF | RdCDMSF | | B9h |
| SCAN | Scan | | BAh |
| SET CD SPEED | SetCDSpeed | | BBh |
| MECHANISM STATUS | MechStatus | | BDh |
| READ CD | RdCD | | BEh |
| READ CA AND SAVE TO FILE | Rd10File | | BEh |
| SEND DISC STRUCTURE | SendDISCStruct | SdStruct | BFh |

FIG. 4

| Bit/Byte | 7 | 5 | 5 | 3 | 2 | 2 | 1 | 0 |
|---|---|---|---|---|---|---|---|---|
| 0 | OP Code (Fxh) | | | | | | | |
| 1 | Reserved | Reserved | Reserved | Reserved | Reserved | Reserved | Reserved | Reserved |
| 2~10 | Reserved | | | | | | | |
| 11 | Vendor-Specific | Reserved | | | | | | |

FIG. 5

| Bit/Byte | 7 | 5 | 5 | 3 | 2 | 2 | 1 | 0 |
|---|---|---|---|---|---|---|---|---|
| 0 | OP Code (Fxh) | | | | | | | |
| 1 | Encryped Data Code | | | | | | | |
| 2~10 | | | | | | | | |
| 11 | | | | | | | | |

METHOD OF CONTROLLING AN OPTICAL DISC DRIVE, AND OPTICAL DISC DRIVE AND OPTICAL INFORMATION WRITING AND/OR READING SYSTEM USING THE METHOD

CROSS-REFERENCE TO RELATED APPLICATION(S)

This application claims the benefit under 35 USC §119(a) of Korean Patent Application No. 10-2011-0129908, filed on Dec. 6, 2011, in the Korean Intellectual Property Office, the entire disclosure of which is incorporated herein by reference for all purposes.

BACKGROUND

1. Field

The following description relates to a method of controlling an optical disc drive, and an optical disc drive using the method.

2. Description of Related Art

Optical disc drives typically use a serial advanced technology attachment (SATA) or a universal serial bus (USB) as an interface device for communicating with a host. For example, the optical disc drives may exchange information through an advanced technology attachment interface (ATAPI) command. The ATAPI command includes a code system for exchanging information with various information recording devices that can be connected to the optical disc drives via the SATA or the USB. Data acquisition from an information recording device and data transmission (recording) to the information recording device may be performed through the ATAPI command.

Some of operation (OP) codes that are not registered in the ATAPI command may be used as a vendor command of a manufacturer. Product characteristic information of the optical disc drive such as optical pickup characteristics, for example, light intensity adjustment, various level adjustment relating to disc detection, and focus balance value adjustment may be performed in response to the vendor command. In addition, writing and reading information to/from an EEPROM included in the optical disc drive, and firmware downloading may be performed.

However, the ATAPI command may be intercepted or hacked using certain equipment thus exposing the ATAPI command. As a result, the vendor command may be abused when it is exposed.

SUMMARY

In an aspect, there is provided a method of controlling an optical disc drive, the method including encoding data that is to be transmitted from a host to the optical disc drive, transmitting the encoded data to the optical disc drive, and decoding the encoded data by the optical disc drive.

The encoded data may comprise an encoded vendor command that is used to perform a function of the optical disc drive and which is not a command defined in the advanced technology attachment packet interface (ATAPI) specification.

The encoded vendor command may comprise an operation (OP) code, and the OP code may not be encoded.

The encoded data may comprise data for recognizing encryption, and the data for recognizing encryption may not be encoded.

The encoded data may comprise a plurality of bytes, and the data for recognizing encryption may be a first byte from among the plurality of bytes.

The encoded data may comprise an advanced technology attachment interface (ATAPI) command format, and the data for recognizing encryption may be an OP code.

In an aspect, there is provided an optical disc drive including an optical pickup, an information processing unit connected to the optical pickup, a servo unit configured to control the optical pickup, a central processing unit configured to control the information processing unit and the servo unit, an interface connected to a host, and a decoder configured to decode data that is encoded and transmitted from the host.

The encoded data may comprise an encoded vendor command that is used to perform a function of the optical disc drive and which is not a command defined in the advanced technology attachment packet interface (ATAPI) specification.

The encoded vendor command may comprise an operation (OP) code, and the OP code may not be encoded.

In an aspect, there is provided an optical information writing and/or reading system including an optical disc drive, a host configured to drive the optical disc drive, an encoder disposed in the host and configured to encode data that is to be transmitted to the optical disc drive, and a decoder disposed in the optical disc drive and configured to decode the data transmitted from the host.

The encoded data may comprise an encoded vendor command that is used to perform a function of the optical disc drive and which is not a command defined in the advanced technology attachment packet interface (ATAPI) specification.

The encoded vendor command may comprise an operation (OP) code, and the OP code may not be encoded.

The encoded data may comprise data for recognizing encryption, and the data for recognizing encryption may not be encoded.

The encoded data may comprise a plurality of bytes, and the data for recognizing encryption may be a first byte from among the plurality of bytes.

The encoded data may comprise an advanced technology attachment interface (ATAPI) command format, and the data for recognizing encryption may be an OP code.

Other features and aspects may be apparent from the following detailed description, the drawings, and the claims.

BRIEF DESCRIPTION OF THE DRAWINGS

FIGS. 3A and 3B are tables illustrating examples of ATAPI commands.

FIG. 4 is a diagram illustrating an example of a data structure of a Fxh vendor command.

FIG. 5 is a diagram illustrating an example of a data structure of a Fxh vendor command having encrypted data.

Figure 1:
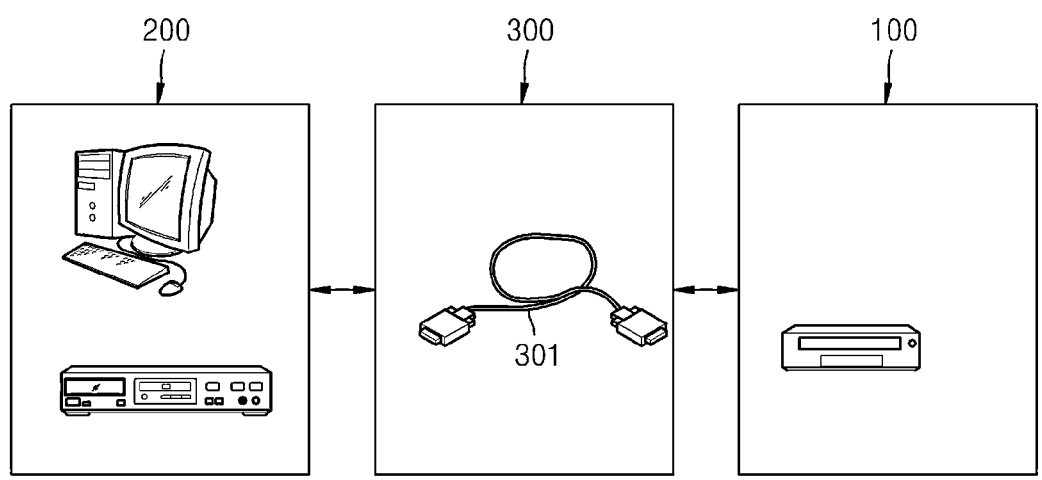
FIG. 1 is a diagram illustrating an example of an optical information writing and/or reading system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of an optical information writing and/or reading system.

Referring to FIG. 1, the system includes a host 200, an optical disc drive (ODD) 100 for writing and/or reading information to/from a disc, and a communication system 300 for exchanging information between the host 200 and the ODD 100. As an example, the host 200 may be a computer, a digital content reproduction device, an audio/video (AV) device, and the like.

In this example, the communication system 300 includes a cable 301. As another example, the communication system 300 may include a wireless communication network such as WiFi and/or BLUETOOTH®. The communication system 300 may transmit an encrypted command, for example, a vendor command, to the ODD 100. The ODD 100 may decode the encrypted vendor command and execute the vendor command. The host 200 may encode the vendor command and transmit the encrypted vendor command to the ODD 100.

Figure 2:
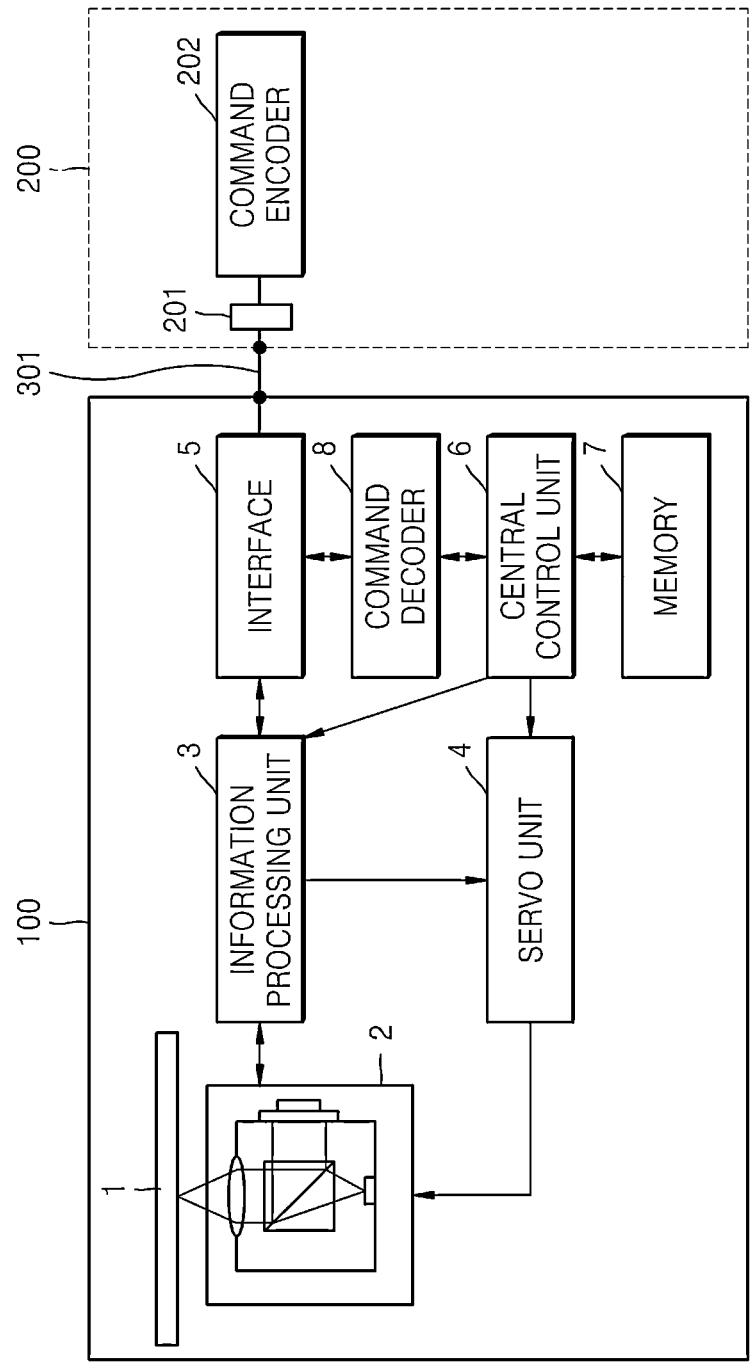
FIG. 2 is a diagram illustrating another example of the optical information writing and/or reading system of FIG. 1.

FIG. 2 illustrates another example of the system shown in FIG. 1.

Referring to FIG. 2, the ODD 100 includes an optical pickup device 2 to read and write information from and to a disc 1, an information processing unit 3, a servo unit 4 for controlling a focusing and a tracking of the optical pickup device 2, an interface 5 connected to an external host 200, and a central control unit 6 for controlling the information processing unit 3 and the servo unit 4. For example, the information processing unit 3 may include a radio frequency (RF) amplifier and an encoder/decoder. In addition, the ODD 100 includes a command decoder 8 for decoding commands received from the host 200. For example, the command decoder 8 may decode encrypted command such as vendor commands. The central control unit 6 may execute the command decoded by the command decoder 8.

In this example, the host 200 includes an interface 201 that is connected to the interface 5 of the ODD 100 via the cable 301, and a command encoder 202 that may encode the command transmitted to the ODD 100. For example, the command encoder 202 and the command decoder 8 may encode and decode the command according to a regulation that is set in advance.

The vendor command may be used to perform a function that may not be processed through an advanced technology attachment packet interface (ATAPI) specification, for example, an operation of the device itself, data certification for security, firmware downloading, and the like. The encryption method may be one of various encryption methods. However, a magnitude of the encrypted vendor command may be less than an allowable magnitude of the ODD 100, for example, 12 bytes.

According to various aspects, in the ATAPI command that has a magnitude of 12 bytes, an OP code of the uppermost 1 byte is not encrypted, and only the lower 11 bytes are encrypted. Accordingly, the ODD 100 may identify the vendor command by using the OP code of the first 1 byte. It should be understood that the examples herein are not limited to a specific encryption method.

According to various aspects herein, a command system or information of a certain operation may be protected with respect to an ODD by encoding a command for executing a certain function. An example of a command to be protected is the vendor command. Accordingly, the encrypted vendor command may be transmitted to the ODD.

FIGS. 3A and 3B are tables that illustrate ATAPI commands. As shown in FIGS. 3A and 3B, the OP code starts from 00$h$ and ends at BFh, and commands regarding storage such as the ODD are allocated to each of the OP codes. The ATAPI command has a magnitude of 12 bytes, and the OP code is located at the first byte.

FIG. 4 illustrates an example of an Fxh vendor command that may be used as the vendor commands among the ATAPI command, and FIG. 5 illustrates an example of an encryption structure of the Fxh vendor command. In these examples, Fxh command is merely for purposes of example.

As shown in FIGS. 4 and 5, the vendor command of Fxh which is allocated to Foh to FFh is encrypted. Here, as shown in FIG. 5, the OP code of the uppermost 1 byte is not encrypted so that the ODD 100 may recognize that the information of 11 bytes under the OP code includes encrypted data from the command transmitted from the host. That is, when the ODD 100 recognizes the OP code of the Fxh, the lower bytes of the OP code are decoded by using the decoder, and after that, an operation corresponding to the OP code is executed.

In the host 200, the command encoder 202 may encode a command, for example, lower bytes of a vendor command. The encoder 202 may be provided to a driver program for driving the ODD 100. Also, the command decoder 8 included in the ODD 100 may be provided as firmware built in the ODD 100. The command encoder 202 and the command decoder 8 may comply with predetermined regulations set by a manufacturer of the ODD.

Figure 6:
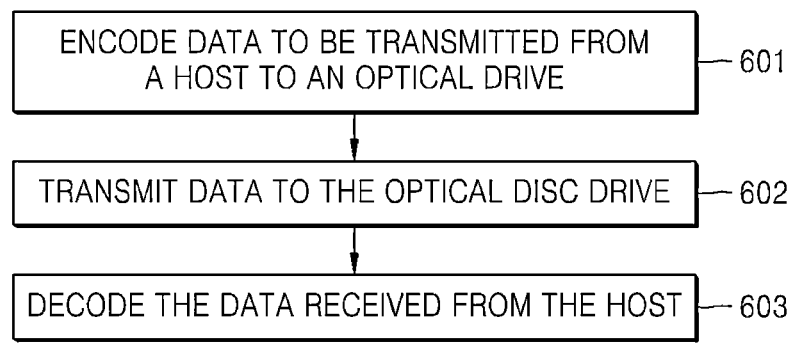
FIG. 6 is a diagram illustrating an example of a method for controlling an optical disc drive.

FIG. 6 illustrates an example of a method for controlling an optical disc drive.

Referring to FIG. 6, data that is to be transmitted from a host to an optical disc drive is encoded in 601. For example, the data may comprise a vendor command. The vendor command may include an OP code that is not encoded. Therefore, the OP code may be used to recognize that the remaining bits are encoded.

In 602, the encoded data is transmitted to the optical disc drive. In 603, the optical disc drive decodes the encrypted data. For example, the command decoder 8 of the ODD 100 shown in FIGS. 1 and 2 may decode encrypted command such as vendor commands.

According to various aspects, the method of encoding and decoding the vendor command may be applied not only to the vendor command, but also to regular commands regulated by ATAPI.

According to various aspects herein, the data exchanged between the ODD and the host may be encrypted and may be protected from being hacked. For example, the vendor command that is used to perform certain functions that may not be processed through the ATAPI specification, for example, certain operations of the ODD itself and data certification for the security, may be encrypted, and thus, hacking and abuse of the data caused by the disclosure of the corresponding command are prevented.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of controlling an optical disc drive, the method comprising:
    encoding data that is to be transmitted from a host to the optical disc drive such that the encoded data is coupled with data used to identify encryption, and the data used to identify encryption is free from encryption;
    transmitting the encoded data together with the data used to identify encryption to the optical disc drive; and
    decoding the encoded data by the optical disc drive.

2. The method of claim 1, wherein the encoded data comprises an encoded vendor command that is used to perform a function of the optical disc drive and which is not a command defined in the advanced technology attachment packet interface (ATAPI) specification.

3. The method of claim 2, wherein the encoded vendor command comprises the data used to identify encryption, and the data used to identify encryption comprises and operation (OP) code, and the OP code is free from being encoded.

4. The method of claim 1, wherein the encoded data comprises a plurality of bytes, and the data used to identify encryption is a first byte from among the plurality of bytes.

5. The method of claim 1, wherein the encoded data comprises an advanced technology attachment interface (ATAPI) command format, and the data used to identify encryption is an OP code.

6. An optical disc drive comprising:
    an optical pickup;
    an information processing unit connected to the optical pickup;
    a servo unit configured to control the optical pickup;
    a central processing unit configured to control the information processing unit and the servo unit;
    an interface connected to a host; and
    a decoder configured to decode data that is encoded and transmitted from the host such that the encoded data is coupled with data used to identify encryption, and the data used to identify encryption is free from being encoded.

7. The optical disc drive of claim 6, wherein the encoded data comprises an encoded vendor command that is used to perform a function of the optical disc drive and which is not a command defined in the advanced technology attachment packet interface (ATAPI) specification.

8. The optical disc drive of claim 7, wherein the encoded vendor command comprises the data used to identify encryption, and the data used to identify encryption comprises an operation (OP) code, and the OP code is free from being encoded.

9. An optical information writing and/or reading system comprising:
    an optical disc drive;
    a host configured to drive the optical disc drive;
    an encoder disposed in the host and configured to encode data that is to be transmitted to the optical disc drive, wherein the encoded data is coupled with data used to identify encryption, and the data used to identify encryption is free from being encoded; and
    a decoder disposed in the optical disc drive and configured to decode the data transmitted from the host.

10. The optical information writing and/or reading system of claim 9, wherein the encoded data comprises an encoded vendor command that is used to perform a function of the optical disc drive and which is not a command defined in the advanced technology attachment packet interface (ATAPI) specification.

11. The optical information writing and/or reading system of claim 10, wherein the encoded vendor command comprises the data used to identify encryption, and the data used to identify encryption comprises an operation (OP) code, and the OP code is free from being encoded.

12. The optical information writing and/or reading system of claim 9, wherein the encoded data comprises a plurality of bytes, and the data used to identify encryption is a first byte from among the plurality of bytes.

13. The optical information writing and/or reading system of claim 9, wherein the encoded data comprises an advanced technology attachment interface (ATAPI) command format, and the data used to identify encryption is an OP code.

14. The optical disc drive of claim 6, wherein the encoded data is encoded by an encoder within the host in order to prevent an ATAPI command from being intercepted.

* * * * *